Jan. 29, 1929.

C. T. DRAPER 1,700,696

CONVEYING AND LOADING MECHANISM FOR BARRELS

Filed Sept. 1, 1925    4 Sheets-Sheet 1

INVENTOR:
CHARLES T. DRAPER
BY
ATTORNEY.

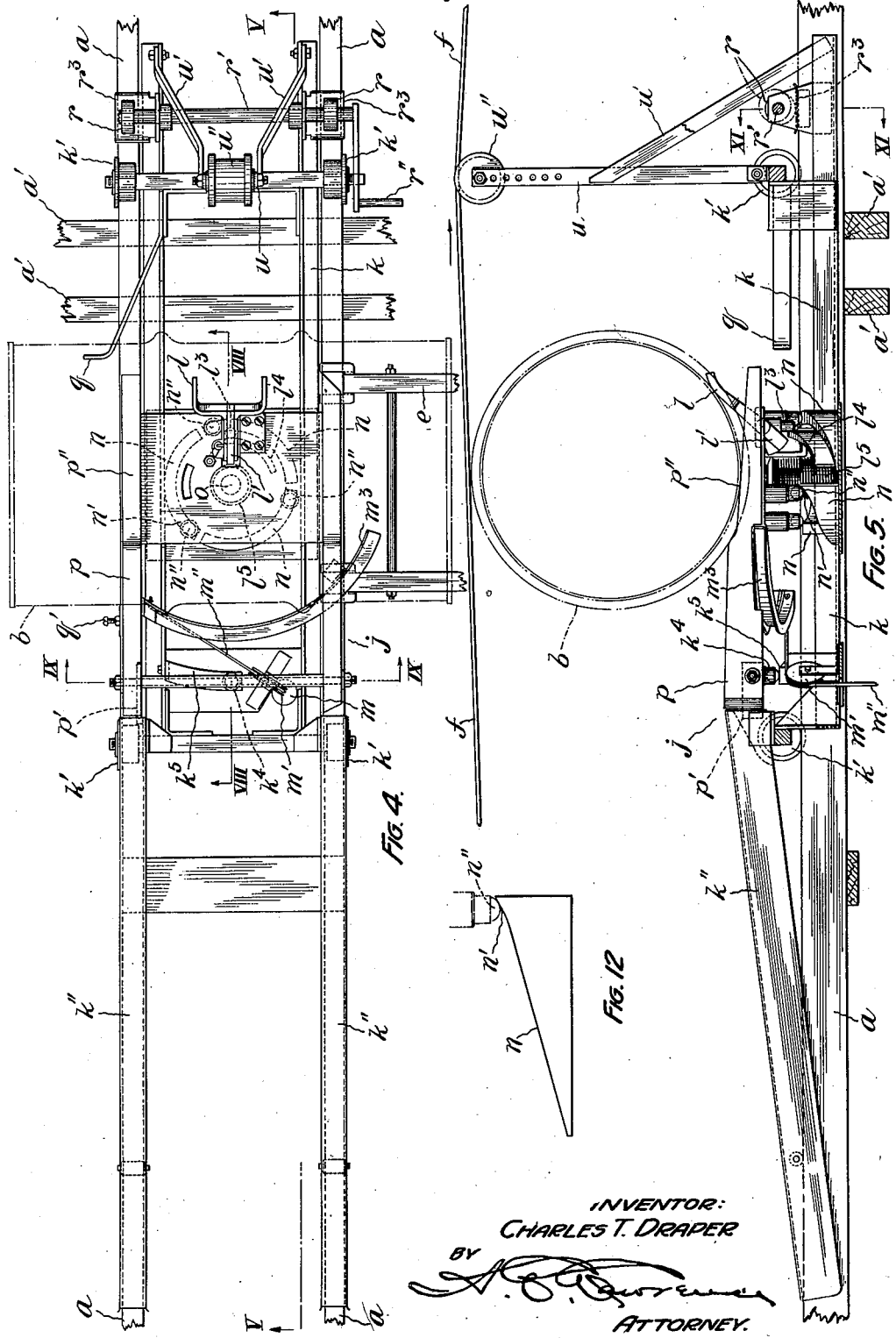

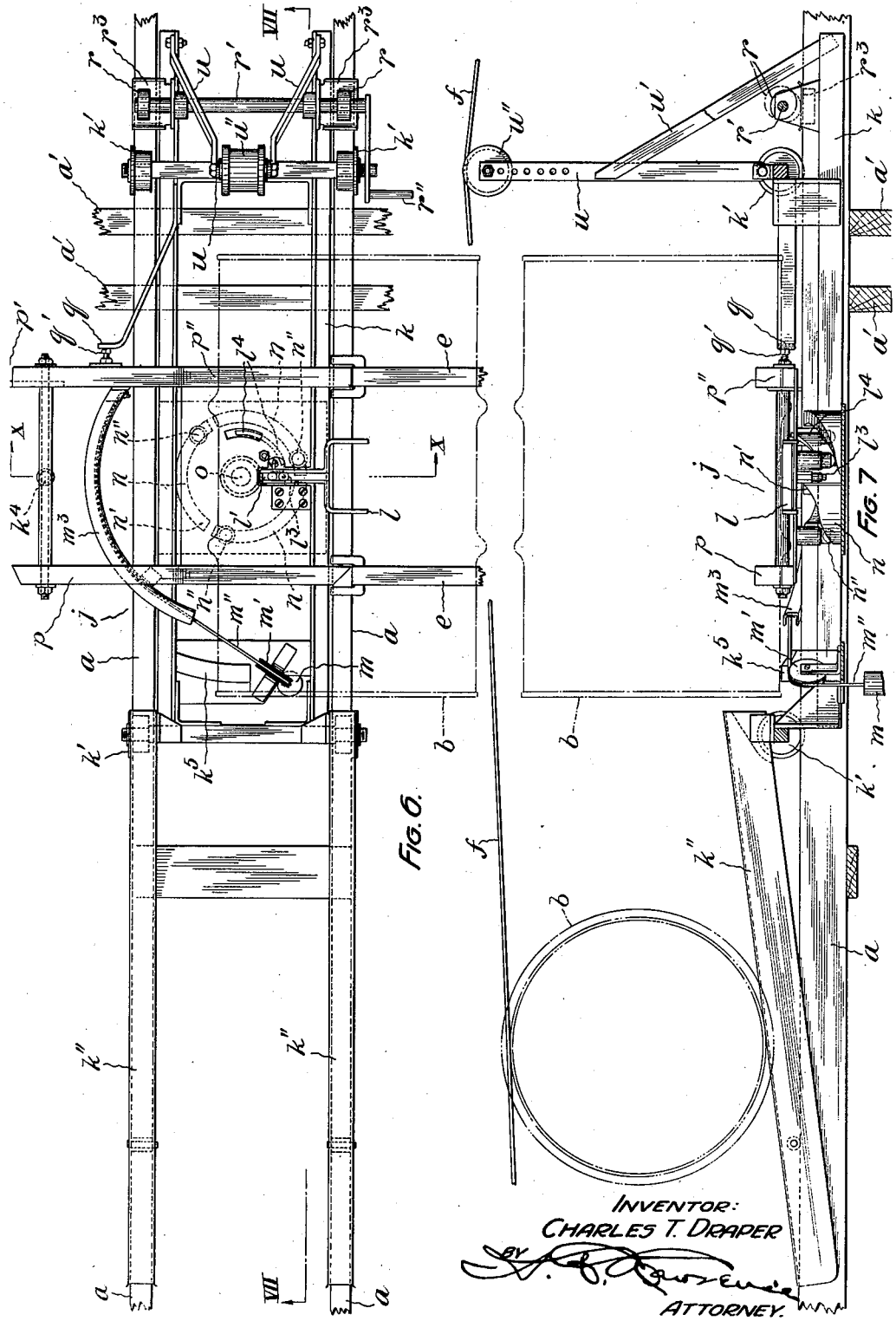

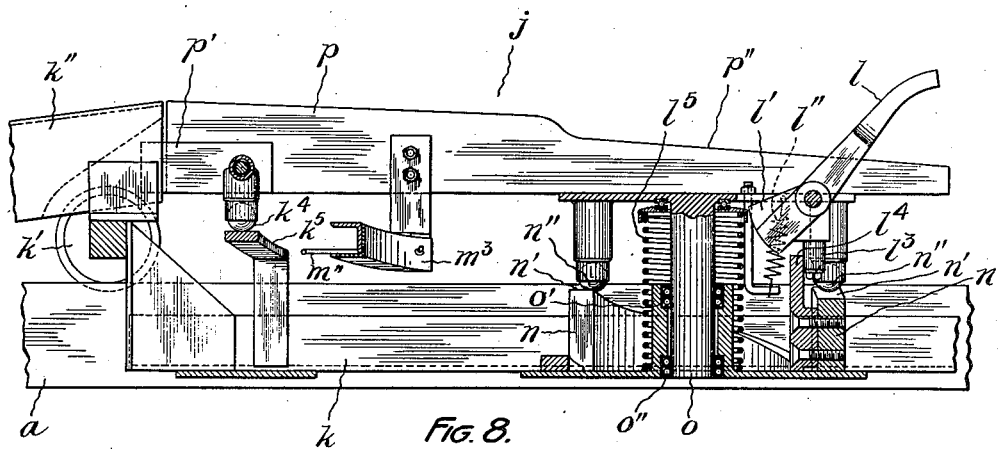
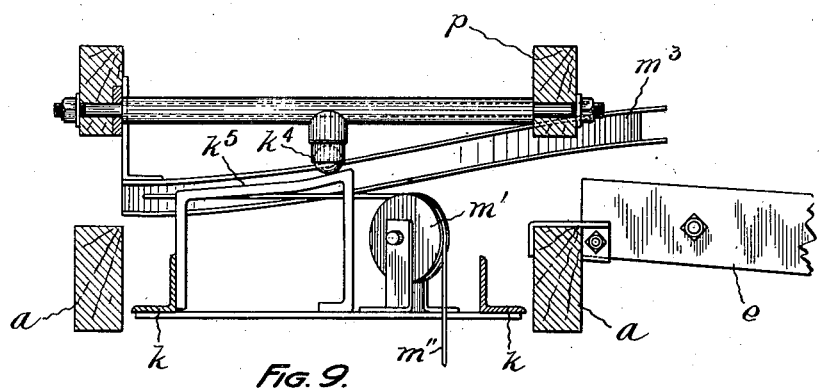
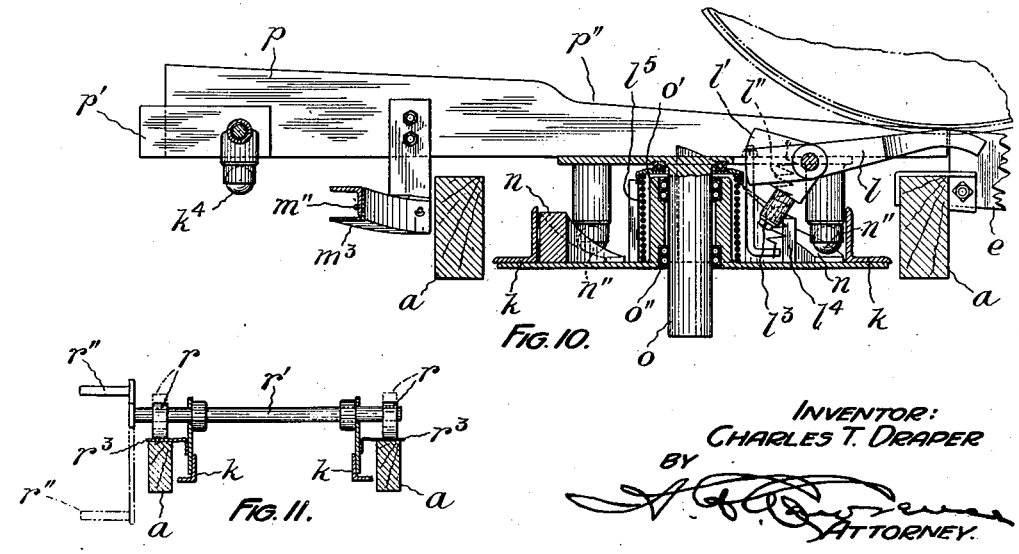

Patented Jan. 29, 1929.

1,700,696

UNITED STATES PATENT OFFICE.

CHARLES T. DRAPER, OF CLEVELAND, OHIO, ASSIGNOR TO THE DRAPER MANUFACTURING COMPANY, OF CLEVELAND, OHIO, A CORPORATION OF OHIO.

CONVEYING AND LOADING MECHANISM FOR BARRELS.

Application filed September 1, 1925. Serial No. 53,837.

My invention relates to improvements in conveying and loading mechanism for barrels, and has for its object the provision of suitable apparatus adapted automatically to convey and load steel barrels or analogous cylindrical articles; the loading to be automatically accomplished, as far as possible, at any desired selectable point along the conveying line. My object further contemplates material efficiency and economy in the operation of such mechanism or system as may be exemplified in the accompanying specific description of the conveying, shifting and loading of standard steel barrels. Obviously, the barrels or analogous cylindrical articles may be filled or unfilled, but I shall describe the adaptation of my improvement to the loading of empty steel barrels into freight cars for transportation to the filling station or factory.

Essentially, the apparatus typifying my invention comprises a skidway that alternatively may be inclined or provided with other means for advancing the barrels any desired distance along the skidway, or such means may be combined, and in association therewith, automatic turning means, adapted to be positioned at any desired loading point along the skidway, preferably are provided in any suitable form.

One suitable form comprises a shifting turntable automatically operated by the supported weight of the barrel and adapted to detain and turn the barrel at right angles with respect to its original line of travel for shifting it to the car or other conveyance; all without the employment of manual labor or supervision of any kind.

The features of the preferred embodiment of my invention may best be explained by making reference to the accompanying drawings illustrating the same, wherein:

Fig. 2 is a side elevation with a minor portion in section on line II—II, Fig. 1.

Fig. 3 is a transverse section on line III—III, Fig. 2.

Fig. 4 is a plan view of a portable shifting appliance or turntable adapted to be positioned at any desired point along the skidway.

Fig. 5 is a vertical section thereof on line V—V, Fig. 4, showing the barrel detained in position upon the platform.

Fig. 6 is a plan view of the appliance in its shifted or rotated position, with the barrel in process of discharging therefrom.

Fig. 7 is a vertical sectional view on line VII—VII, Fig. 6, also showing the advance of the next succeeding barrel up the short incline to the turntable.

Fig. 8 is an enlarged fragmentary longitudinal section on line VIII—VIII, Fig. 4, particularly illustrating the automatic shifting mechanism of the turntable and its detent.

Fig. 9 is an enlarged vertical section on line IX—IX, Fig. 4, particularly illustrating the arc for the counter-weight cable and the lateral frame and ball bearing support for the platform.

Fig. 10 is another enlarged vertical section in fragmentary form on line X—X, Fig. 6, illustrating the members of the turntable in its discharging position and its detent released.

Fig. 11 is another vertical section of reduced scale on line XI—XI, Fig. 5, illustrating the positioning means for said turntable, and Fig. 12 is an enlarged developed view of one of the helical ball race supports.

Throughout the several figures of the drawings I have employed the same character of reference to indicate similar parts.

Figure 1:
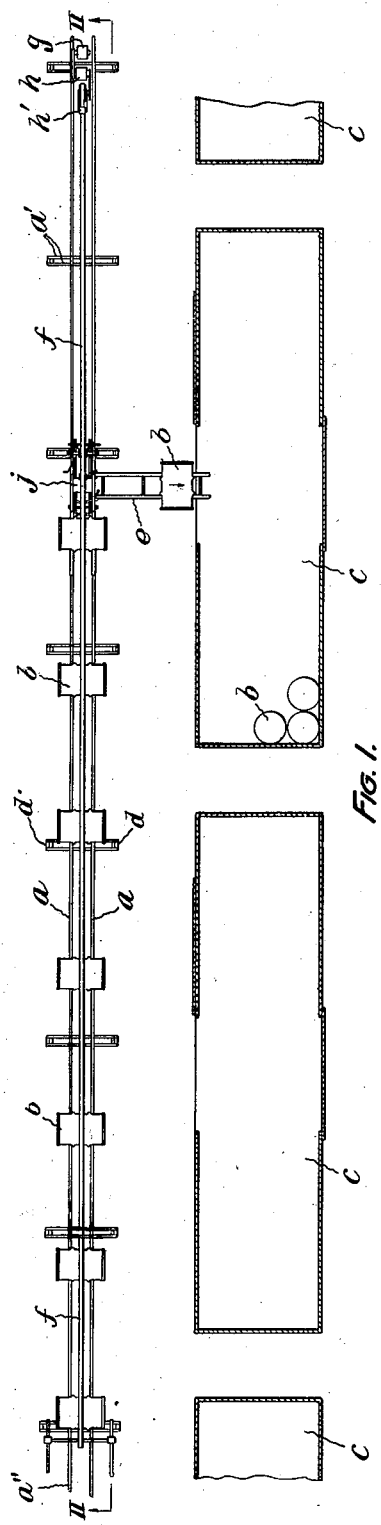
Figures 1, 2 and 3 are views, partly in diagram, of a skidway equipped with my improvements, Fig. 1 being a longitudinal plan view of the skidway with its shifting appliance and the showing of adjacent box cars into which the barrels may be loaded.
Figure 2:
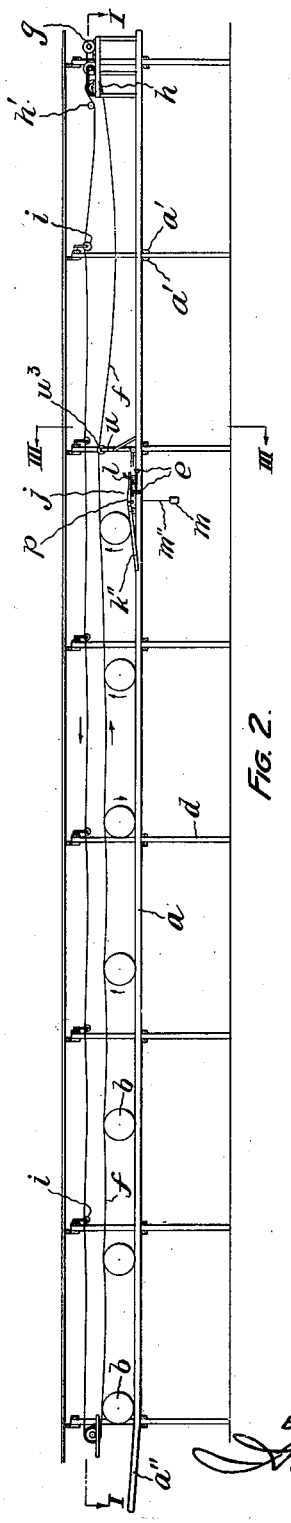
Figure 3:
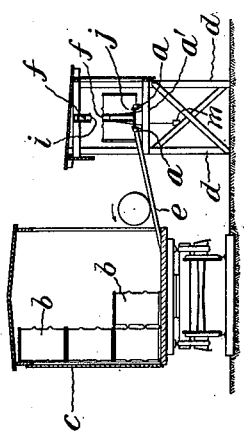

Discussing first the disclosure of Figs. 1, 2 and 3, there are shown a skidway comprising the parallel rails $a$, $a$, supported in elevated position from cross members $a'$, and the paired uprights $d$. The extreme left-hand portion of the skidway is slightly inclined at $a''$ for the introduction of the barrels $b$. Alongside of the skidway there are diagrammatically shown, in section, the box cars $c$, $c$, which are adapted to receive the barrels. Opposite the door of the right-hand car, a short skidway $e$ is positioned, in association with which suitable shifting or turning mechanism, later to be described, is provided for directing the barrels interiorly of the car, through its open door.

Extending longitudinally of the skidway, there is provided an endless belt $f$ carried along its upper level by idlers $i$ and driven at its farther end by the motor $g$, connected to the driving pulley $h$ with its associated idler $h'$. It will be observed that the underside of this overrunning belt contacts with the upper peripheries of the ribbed steel barrels, whereby the barrels are frictionally rotated to travel longitudinally of the skidway with a minimum expenditure of power. Opposite the open car door, there is provided suitable turning detent mechanism which is indicated at $j$, whereby barrels successively are turned at right angles to roll upon the skidway $e$ interiorly of the car and receive their only manual handling in being piled solidly for shipment therein.

While I do not desire to be limited to the precise shifting mechanism adapted to be positioned along the skidway for transferring the barrels or other cylindrical articles therefrom to the carrier, I shall describe the preferred weight-operated means for efficiently accomplishing the removal of the barrels at any selected point along the skidway, it being understood that said means preferably are capable of ready transfer and immediate association with the skidway for loading into different carriers.

The demands made upon a shifting appliance of this particular type usually preclude power actuation thereof, combined with extremely simple construction of relatively light portable character, and the maximum of horizontal compactness. Accordingly, I have adopted a weight-operated shifting turntable as the preferred type and will describe the details thereof in their adaptation to the conveying skidway above set forth.

Referring first to Figs. 4 and 5, it will be observed that the shifting turntable is mounted upon a metal frame $k$, carried by four flanged rollers $k'$ bearing upon the skidway. Paired inclined members $k''$ afford the approach to the rotatable platform $p$, laterally supported by the ball-bearing $k^4$; better shown in Fig. 9 in its supporting position upon the inclined ball race $k^5$, whereby any tendency toward tilting the platform by an advancing barrel is overcome. The platform $p$ at its right or discharge end is provided with a forked detent $l$ having a counter-weight $l'$, a spring $l''$, and a roller $l^3$ which bears against an arcuate cam $l^4$, as best shown in Figs. 8 and 10. Said platform also is provided with a supporting spring $l^5$ adapted to restore it to its normal or receiving position, and with a counter-weight $m$ supported from its pulley $m'$ by a light cable $m''$ terminally attached at the farther end of its grooved arc $m^3$; these members co-acting with the restoring spring $l^5$ to insure the normal or receiving position of the unweighted platform, as shown in Figs. 4, 5 and 8.

The yielding weight-operated mechanism for shifting or rotating the platform, comprises three helical supports $n$ having more abruptly inclined faces $n'$ along their upper ranges upon which three ball supports $n''$ are adapted to travel approximately through arcs of 90° under the impetus of any material weight supported by the rotatable platform which is provided with an axial shaft $o$ having upper and lower ball-bearings $o'$, $o''$, for rendering the operation of said platform more sensitive and efficient with respect to the reception and discharge of the barrels or other cylindrical articles. A terminal stop $p'$ is provided for insuring the normal alinement of the platform with the skidway and its inclines, while a blocking member $q$ is positioned to be engaged by the adjustable stop $q'$ when the platform has been rotated to its discharge position through a 90° arc, turning in a clockwise direction.

Near the right hand end of the portable frame, there are provided the eccentric cam members $r$, connected by the shaft $r'$ with the handle $r''$, each of said cams having its friction plate $r^3$ adapted to be brought into engagement with the rails $a$, $a$, as best shown in Figs. 4, 5 and 11. With the cams in their full line position it will be seen that the two right hand flanged rollers $k'$ are elevated from the skidways so that the device is frictionally held in its adjusted position upon the skidway, while with these cams rotated to their dotted line position, all four of the flanged rollers $k'$ will rest upon the rails $a$, $a$, and the device is readily moved from one point to another as required for use.

Near the further end of the frame, there are provided upright arms $u$ having braces $u'$ between which arms an idler $u''$ is adapted to be adjustably positioned at any desired height for supporting the belt $f$ out of contact with the barrel or other cylindrical article, immediately after its engagement with the forked detent $l$, as shown in Fig. 5, so that the belt will not interfere with the discharge of the barrel when the shifting platform has rotated it through an arc of 90°, as further indicated in Fig. 7.

The automatic loading and discharge of the barrels will very readily be understood since the shifting platform is held on the upper ranges of the helical supports merely by the spring and counter-weight. Immediately the barrel has been drawn up the incline, Fig. 7, and bears upon the left hand end of the platform, although supported by the ball and race, $k^4$, $k^5$, there is imparted a tendency to turn the platform and barrel in a clockwise direction against the tension of the combined yielding means. Moreover, the ball supports $n''$ are given a sharp initial impetus, by the weight of the barrel, and the platform turns in descending the helical ball races n, until the blocking member q is engaged by the adjustable stop q', and the roller l³ of the detent l, is released from its helical cam l⁴, as shown in Figs. 6, 7 and 10.

It will be seen that the barrel at once sinks beneath the level of the belt f and as soon as the detent l is released, its immediate tendency is to roll from the inclined portion p'' of the shifting platform upon the right-angle skidway e, whereupon the platform is promptly restored to its normal or receiving position through the combined action of the spring l⁵ and counter-weight m, although either means may be used alternatively. Before the platform turns, however, detent l is restored to its vertical position by the spring and counter-weight as soon as the barrel leaves the platform so that the roller l³ is reengaged by its helical cam.

The next advancing barrel upon the incline meantime receives additional impulse from the traveling belt f to carry it promptly upon the shifting platform, as indicated in Fig. 7, so that the platform will be automatically loaded from the skidway and will discharge into the car or other carrier, as long as the traveling belt is actuated by its motor. Very little power, however, is required for frictionally rolling the ribbed barrels along the skidway and up the short incline to the shifting platform, and the weight alone is relied upon for turning the barrel at right angles and discharging it from said platform. That is to say, the shifting is wholly gravity-operated, preferably in the vertical axis of the rotatable platform and supported barrel, after the latter has lost its momentum and while being retracted from the actuating belt. Consequently, my improved apparatus is economical in its operation, sensitive to the actuating weight, and unlikely to stall or get out of order. Moreover, the portable shifting turntable readily lends itself to being repositioned at any desired point along the skidway and to the conveyance of barrels or other cylindrical articles of varying sizes from time to time.

While I do not wish to be understood as limiting my invention to the precise apparatus herein shown and described, except as the same may be specified in the appended claims, nor to the association of any specific turning detent mechanism with the conveying skidway, their ready and efficient cooperation will be perceived from the foregoing description.

Having now described the preferred embodiment of my invention and a typical adaption thereof, I claim as new and desire to secure by Letters Patent, together with such modifications as may be made by those ordinarily skilled in the art, the following:

1. In loading apparatus of the class described, the combination with a skidway extending longitudinally of a plurality of selectable delivery positions, of means for impelling cylindrical articles along the skidway, and a rotating detent mechanism adapted to be positioned at different points along the skidway for effecting the discharge of the articles being conveyed thereby, substantially as set forth.

2. In loading apparatus of the class described, the combination with a skidway extending longitudinally of a plurality of selectable delivery positions, of travelling belt mechanism for impelling articles along the skidway, and a rotating detent mechanism adapted to be positioned at different points along the skidway for effecting the successive discharge of the articles being conveyed, including means for releasing the articles successively at 90° from their original line of travel, substantially as set forth.

3. In loading apparatus of the class described, the combination with a conveying skidway extending longitudinally of a plurality of selectable delivery positions, of an overhead belt travelling substantially the length of the skidway and adapted to bear upon the articles being conveyed, and an adjustable detent mechanism including means for releasing the articles successively approximately at right angles to the skidway at a given delivery position along the same, substantially as set forth.

4. In loading apparatus of the class described, the combination with a conveying skidway extending longitudinally of a plurality of selectable delivery positions, of means for impelling cylindrical articles along the skidway, and means adjustable upon said skidway for automatically turning the articles successively so that their axes are substantially parallel to their original line of travel, substantially as set forth.

5. In apparatus of the class described, the combination with a skidway, of mechanism for impelling cylindrical articles along the skidway, comprising an overrunning endless belt adapted to contact with the upper peripheries of said articles when in conveying position upon the skidway, a plurality of space supporting members for the upper stretch of said belt, and motor mechanism for driving the belt, discharge mechanism for said articles intermediately positioned beneath the belt, and an adjacent co-operating support for the underside of said belt, substantially as set forth.

6. In apparatus of the class described, the combination with a skidway, of mechanism for impelling cylindrical articles along the skidway, comprising an overrunning endless belt adapted to contact along its underside with the upper peripheries of said articles, rotatable supporting means positioned at intervals along said belt, and a power-connection for driving the belt and impelling said cylindrical articles, discharge mechanism for said articles intermediately positioned beneath the belt, and an adjacent cooperating support for the underside of said belt, substantially as set forth.

7. In a shifting appliance of the class described, the combination with a receiving platform mounted for axial movement of an inclined support therefor, and a counterweight associated with said platform adapted normally to maintain it on the upper range of said inclined support, substantially as set forth.

8. In a shifting appliance of the class described, the combination with a shiftable platform, of a helical support therefor, and yielding means for maintaining said platform upon the upper range of its helical support, substantially as set forth.

9. In a shifting appliance of the class described, the combination with a receiving platform of a shiftable mounting therefor, including inclined supporting faces, yielding means for maintaining said platform normally upon the upper range of its inclined support, a detent operable in the normal position of said platform, and means for releasing the detent, substantially as set forth.

10. In a shifting appliance of the class described, the combination with a receiving platform, of a shiftable mounting therefor, including inclined supporting faces of initially abrupt inclination, yielding means for maintaining said platform normally supported upon the abrupt inclines and for permitting the shifting of the weighted platform, substantially as set forth.

11. In a shifting appliance of the class described, the combination with a shiftable receiving platform, of gravity-operated means for effecting the movement thereof, a detent for normally checking an article in operative position upon the platform, and means for releasing the detent with the shifting movement of the platform, substantially as set forth.

12. In a shifting appliance of the class described, the combination with a shiftable receiving platform, of gravity-operated means for effecting the movement thereof, and means for temporarily blocking the platform in its shifted position, substantially as set forth.

13. In loading apparatus of the class described, the combination with a shiftable receiving platform, of gravity-operated means for effecting the movement thereof, a detent operable in one position to engage the article to be shifted, and means for temporarily blocking the platform in its shifted position until released from the weight of the article, substantially as set forth.

14. In a shifting turn-table, the combination with a weight-receiving platform mounted for axial movement, of weight-operated means for effecting such movement, comprising helical inclined supporting faces and ball-bearings therefor, yielding means for carrying the platform normally upon the upper range of the helical supports, a detent adapted to check the shifted article in operative position upon the platform, and means for releasing the detent and permitting the discharge of the article when in shifted position, substantially as set forth.

15. In a shifting turn-table, the combination with a weight-receiving platform mounted for turning movement, of weight-operated means for effecting such movement, comprising helical inclined supporting faces of initially abrupt inclination, yielding means for carrying the platform normally to the upper abruptly inclined range of the helical supports, a detent normally retaining the shifted article in operative position upon the platform, and means for blocking the platform in its shifted position until the article is discharged, substantially as set forth.

16. In a shifting appliance of the class described, the combination with a receiving platform mounted for turning movement, of an inclined support therefor, and yielding means adjusted to the weight of the article to be shifted, associated with said platform and adapted normally to maintain it on the upper range of said inclined support, substantially as set forth.

17. In a shifting appliance of the class described, the combination with a shiftable platform, of helical supporting means therefor, yielding means for maintaining said platform upon the upper range of its helical support, and means for anchoring the shifting appliance in its adjusted position, substantially as set forth.

18. In loading apparatus of the class described, the combination with a substantially horizontal skidway extending longitudinally of a plurality of alternative delivery positions, of means for impelling cylindrical articles along said skidway, and means traveling upon said skidway for automatically turning the articles successively at a selected delivery position for their discharge therefrom, substantially as set forth.

19. In loading apparatus of the class described, the combination with a substantially horizontal skidway extending longitudinally of a plurality of alternative delivery positions, of means for impelling cylindrical articles along said skidway, and means adjustably positioned thereon for turning the articles on their vertical axes intermediately of the skidway for effecting their discharge at a selected delivery position, substantially as set forth.

20. In loading apparatus of the class described, the combination with a substantially horizontal skidway extending longitudinally of a plurality of alternative delivery positions, of means for impelling cylindrical articles along said skidway, and adjustable weight-operated means traveling upon said skidway for automatically turning the articles successively at a selected delivery position for their discharge from said skidway, substantially as set forth.

21. In loading apparatus of the class described, the combination with a substantially horizontal skidway extending longitudinally of a plurality of alternative delivery positions, of an overhead belt extending substantially the length of the skidway and adapted to bear upon the articles being conveyed along the skidway, weight-operated means adjustable upon said skidway for automatically turning the articles successively at a selected delivery position and effecting their discharge, and adjustable means for supporting the belt out of contact with the article being discharged, substantially as set forth.

22. In a shifting appliance of the class described, the combination with a receiving platform mounted for axial movement, of gravity-operated means for effecting such axial movement upon loading said platform, and yielding mechanism associated therewith adapted normally to maintain the platform in its receiving position, substantially as set forth.

23. In a shifting appliance of the class described, the combination with a receiving platform mounted for axial movement, of gravity-operated means for effecting such axial movement upon loading said platform, an adjustable detent for the load, means for releasing the same in the discharge position of the platform, and yielding mechanism connected with the platform adapted normally to maintain the unloaded platform in its receiving position, substantially as set forth.

24. In a shifting appliance of the class described, the combination with an inclined approach, of an associated shiftable receiving platform, gravity-operated means for effecting the movement thereof, a retaining detent for the load, means for releasing the detent and load in the discharge position of the platform, and yielding mechanism connected with said platform and adapted normally to maintain it in its receiving position, substantially as set forth.

25. In a shifting appliance of the class described, the combination with a shiftable receiving platform, of weight-operated means for effecting the shifting movement thereof, and a radially positioned ball-bearing support for carrying extra weight of a loaded platform, substantially as set forth.

26. In a shifting appliance of the class described, the combination with a shiftable supporting platform, of weight-operated means for effecting the movement thereof, an inclined outer support for the platform, and a radially positioned rotatable supporting member mounted upon the platform and traveling upon the inclined support, substantially as set forth.

In testimony whereof I do now affix my signature.

CHARLES T. DRAPER.